(No Model)
W. C. HOMAN.
LAMP BURNER.
No. 586,269. Patented July 13, 1897.
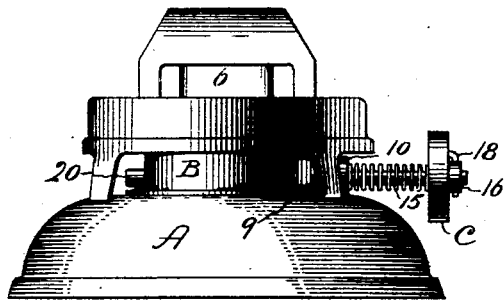
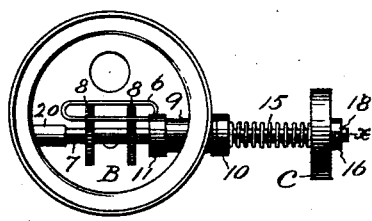
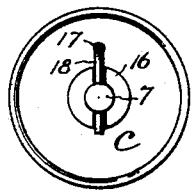
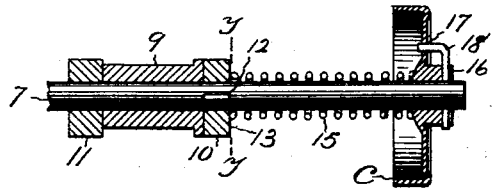
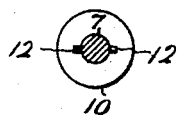
Witnesses
Inventor
William C. Homan
By James Shepard
Atty.

UNITED STATES PATENT OFFICE.

WILLIAM C. HOMAN, OF MERIDEN, CONNECTICUT, ASSIGNOR TO THE EDWARD MILLER & COMPANY, OF SAME PLACE.

LAMP-BURNER.

SPECIFICATION forming part of Letters Patent No. 586,269, dated July 13, 1897.

Application filed March 6, 1897. Serial No. 626,297. (No model.)

*To all whom it may concern:*

Be it known that I, WILLIAM C. HOMAN, a citizen of the United States, residing at Meriden, in the county of New Haven and State of Connecticut, have invented certain new and useful Improvements in Lamp-Burners, of which the following is a specification.

My invention relates to improvements in lamp-burners; and the chief object of my invention is to provide new and simple means for creating friction on the wick-raising shaft.

In the accompanying drawings, Figure 1 is a side elevation of the upper part of a lamp-fount with my burner secured thereto. Fig. 2 is a reverse plan view of the main portion of the burner. Fig. 3 is an enlarged side elevation or end view of the wick-raising shaft, together with the operating disk or knob. Fig. 4 is a longitudinal section, partly in elevation, on the line $x$ of Fig. 2; and Fig. 5 is a transverse section of the wick-raising shaft on the line $y\ y$, Fig. 4.

A designates the top of the lamp-fount, and B the burner-base secured to the top of said fount. This base is provided with an ordinary wick-tube 6 and with the wick-raising shaft 7, carrying the ordinary spur-wheels 8, which extend into the wick-tube, as shown in Fig. 2. This shaft is supported in any suitable bearings 9 and 10, which may be secured to the burner-base in any ordinary manner. In addition to the spur-wheels 8 said shaft is provided with a collar 11, rigidly fixed thereon, which collar bears against the inner end of the bearing or box 9 for the wick-shaft. The outer portion of the wick-raising shaft 7 is provided with wings or splines 12, Figs. 4 and 5, and a collar 13, having grooves into which the said splines enter, whereby said collar 13 may move endwise on the shaft, but must necessarily rotate therewith. At the outer end of the shaft is the wick-raising disk or knob C, and between said knob and the collar 13 is a spiral spring 15, which has a tendency to exert a pressure on the collar 13, forcing it against the end of the bearing 9 and thereby drawing the shaft endwise through said bearings, so as to draw the collar 11 against the opposite end of said bearing with all the force of said spring. The said disk or knob C may be secured to the wick-shaft in any proper manner, but I prefer to secure it by the means herein shown and described. The outer end of the hub 16 of said disk or knob is slotted transversely through its center, and the wick-shaft is provided with a transverse hole near its outer end. I also provide the disk or knob with a hole 17 parallel to its axis, and I secure this disk on the shaft by means of the angular pin 18, one arm of which enters the hole 17 and the other arm of which passes through the slot within the hub 16 and also through the hole in the end of the wick-shaft 7. This pin is inserted in its place by first placing the disk or knob upon the shaft, then forcing it endwise thereon beyond its normal position, so that the pin 18 may be passed through the hole in the end of the shaft. The pin is then turned with its short arm facing the hole 17 in the disk or knob. The knob is then released to the force of the spring, but guided by hand, so as to make the short arm of the angular pin 18 enter the hole 17 and have the slot in the hub 16 embrace the other arm of the pin as the knob moves into place under force of the spring.

It is obvious that the collar 10 might be omitted, if desired, letting the end of the spring 15 bear directly against the end of the bearing 9. The object of the collar 10, which necessarily rotates with the wick-shaft, is to cause the wick-shaft to turn smoothly and avoid any jumping or uneven action in the rotation of said shaft.

I do not wish to limit myself to the precise details of construction shown and described, but reserve the right to make such changes as fairly fall within the limit and scope of my invention. I do not claim, broadly, a shouldered wick-raising shaft and devices for exerting an endwise pressure on said shaft for forcing the shoulder thereof against its bearing, as the same is shown, described, and claimed in my Patent No. 564,309, dated July 21, 1896.

I claim as my invention—

1. A lamp-burner, the shaft of which is provided with a fixed collar 11 upon the inside of its bearing and with the collar 10, spring 15, and disk or knob C outside the said bearing, for holding the wick-shaft under tension, substantially as described.

2. A lamp-burner having the wick-raising shaft with fixed collar at the inner end of one bearing, a spring at the outer end of said bearing; an operating disk or knob, having the transversely-slotted hub and the pin-hole 17, in combination with the angular pin 18, substantially as described.

WILLIAM C. HOMAN.

Witnesses:
   CHAS. E. HOMAN,
   ALFRED DUNLOP.